United States Patent
Brodie et al.

(10) Patent No.: US 7,549,054 B2
(45) Date of Patent: Jun. 16, 2009

(54) SYSTEM, METHOD, SERVICE METHOD, AND PROGRAM PRODUCT FOR MANAGING ENTITLEMENT WITH IDENTITY AND PRIVACY APPLICATIONS FOR ELECTRONIC COMMERCE

(75) Inventors: Carolyn Ann Brodie, Briarcliff Manor, NY (US); Maroun Touma, Redding, CT (US); Charles Philippe Tresser, Brooklyn, NY (US); Catherine Gody Wolf, Katonah, NY (US); Joel Wolf, legal representative, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 10/919,845

(22) Filed: Aug. 17, 2004

(65) Prior Publication Data

US 2006/0041436 A1    Feb. 23, 2006

(51) Int. Cl.
*G06F 9/00* (2006.01)
(52) U.S. Cl. .................. 713/182; 713/166; 713/167
(58) Field of Classification Search ............. 713/182, 713/166, 167
See application file for complete search history.

(56) References Cited

U.S. PATENT DOCUMENTS 5,493,692 A    2/1996  Theimer et al. ............. 455/26
6,123,737 A    9/2000  Sadowsky .................... 717/11

FOREIGN PATENT DOCUMENTS

| GB | 2336 697 A | 10/1999 |
|----|------------|---------|
| GB | 2349244 A  | 10/2000 |
| WO | WO 00/11585 | 2/2000 |
| WO | WO 00/48110 A2 | 8/2000 |
| WO | WO 00/48110 A3 | 8/2000 |

OTHER PUBLICATIONS

Knowledge Discovery and Delivery XP-000765546, by John Davies and Ralph Cochrane, (British TeleCommunications Engineering, vol. 17, Apr. 1998) pp. 25-35.
Technical Note Webtree: A Web Service Aggregator XP-001002913, by Y. Zhao, (IBM Systems Journal, vol. 37, No. 4 1998) pp. 584-595.
Software Lab Report: When Push Comes to Serve XP-0010779586, Byte Jul. 1998, pp. 102.
The RealPush Network: A New Push-Type Content Delivery System Using Reliable Multicasting, by Shingo Kinoshita, Teruji Shiroshita, Takahiko Nagata, Nippon Telegraph and Telephone Corp., Information and Communication Labs., pp. 1216-1223, 1-1 Hikari-no-oka, Yoksuka, Kanagawa 239-0847, Japan E-mail: kinoshita@isl.ntt.co, jp.IEEE Transactions on Consumer Electronics, vol. 44, No. 4, Nov. 1998, Manuscript received Jun. 17, 1998.

*Primary Examiner*—Thomas R Peeso
(74) *Attorney, Agent, or Firm*—F. Chau & Associates, LLC

(57) ABSTRACT

A system, method, service method, and program product for defining and/or managing entitlements and/or authentication entitlements to resources in a computer networking environment is disclosed. Upon receiving one or more dynamic events, the invention verifies one or more users (a selected user) has (entitlement) attributes that satisfy one or more access criteria to access one or more resources. The invention then permits and/or provides access to one or more resources for the selected user over one or more networks without revealing the identity of the selected user to the resource provider.

20 Claims, 15 Drawing Sheets

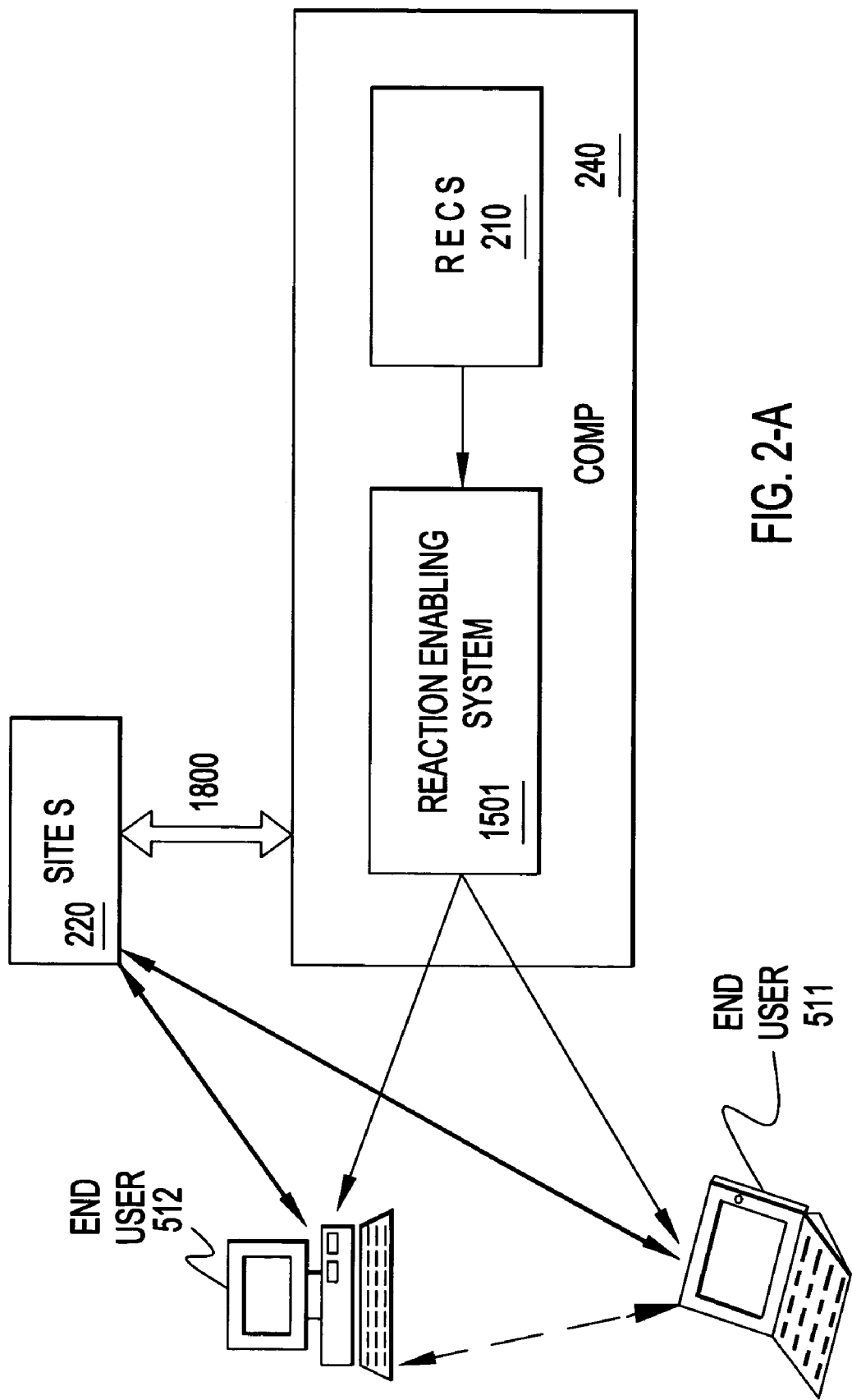
FIG. 2-A

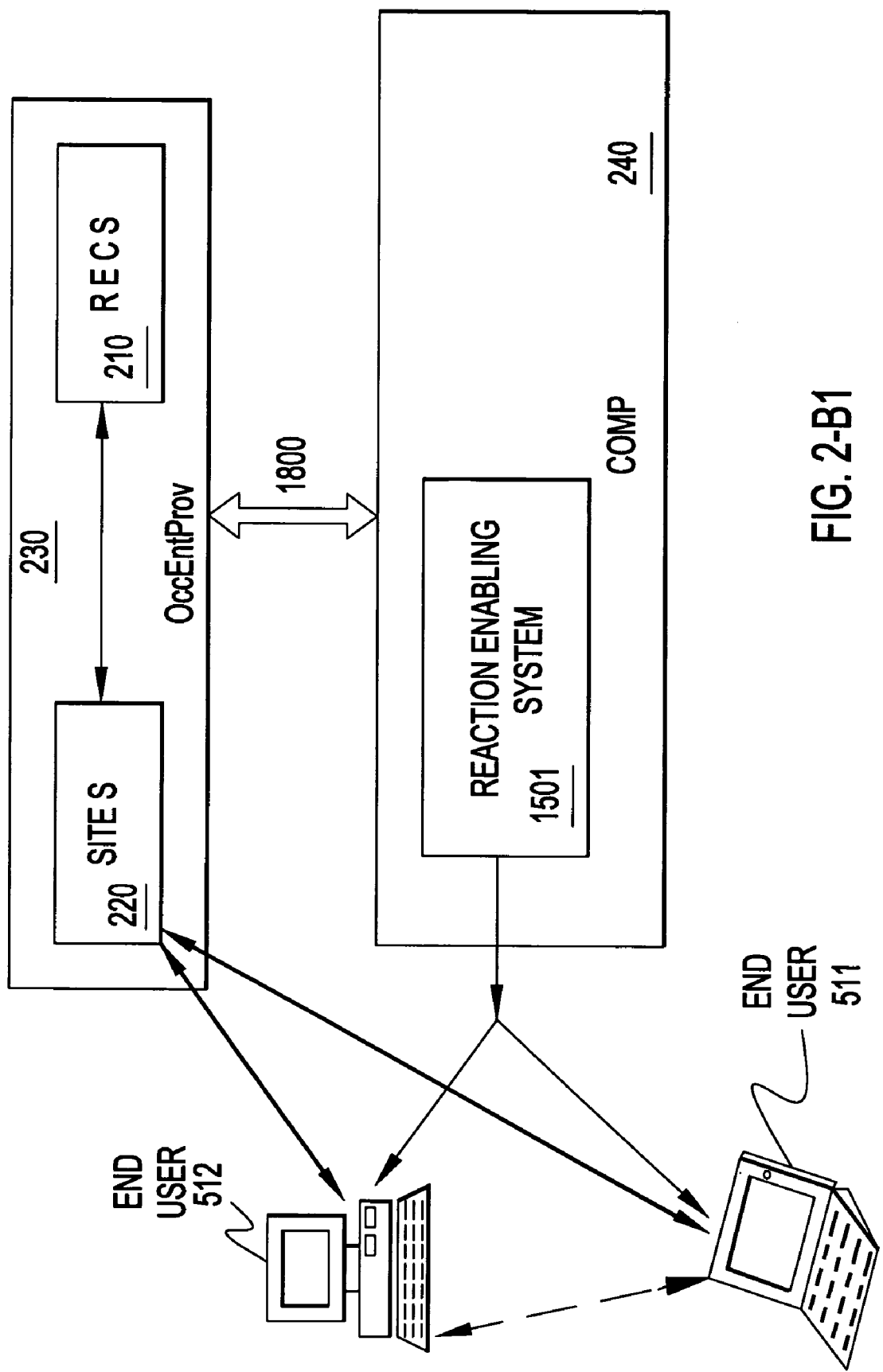
FIG. 2-B1

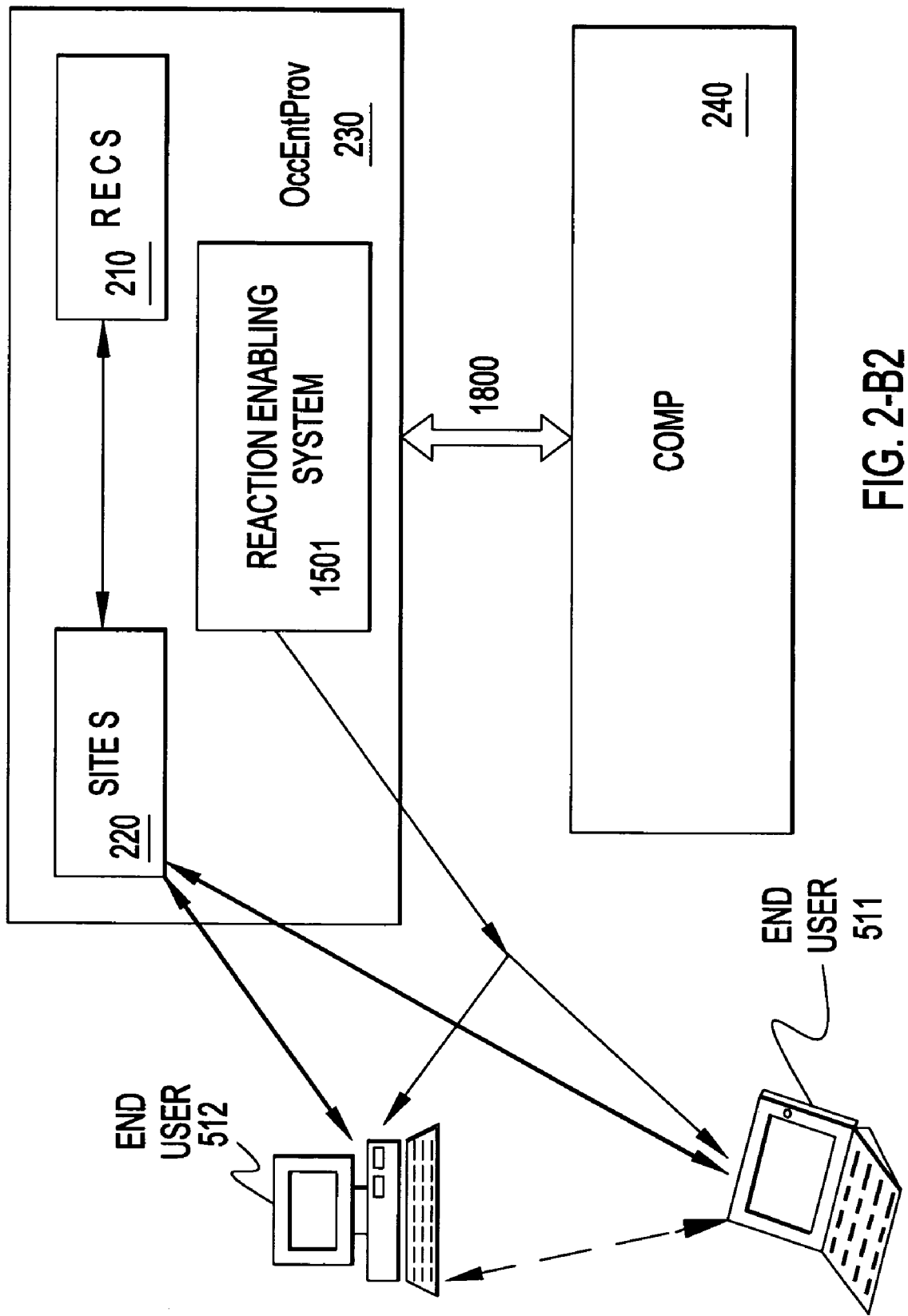
FIG. 2-B2

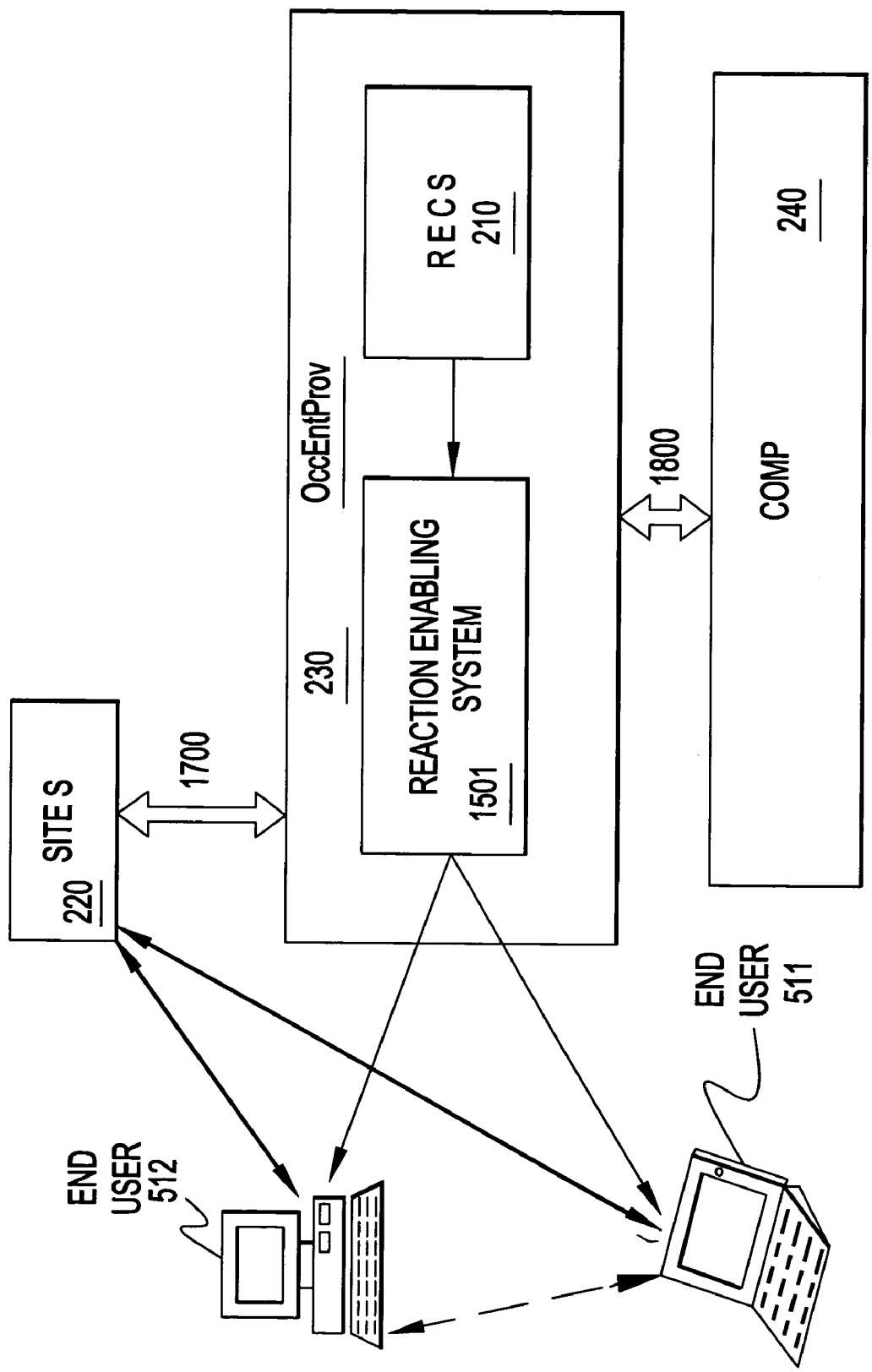

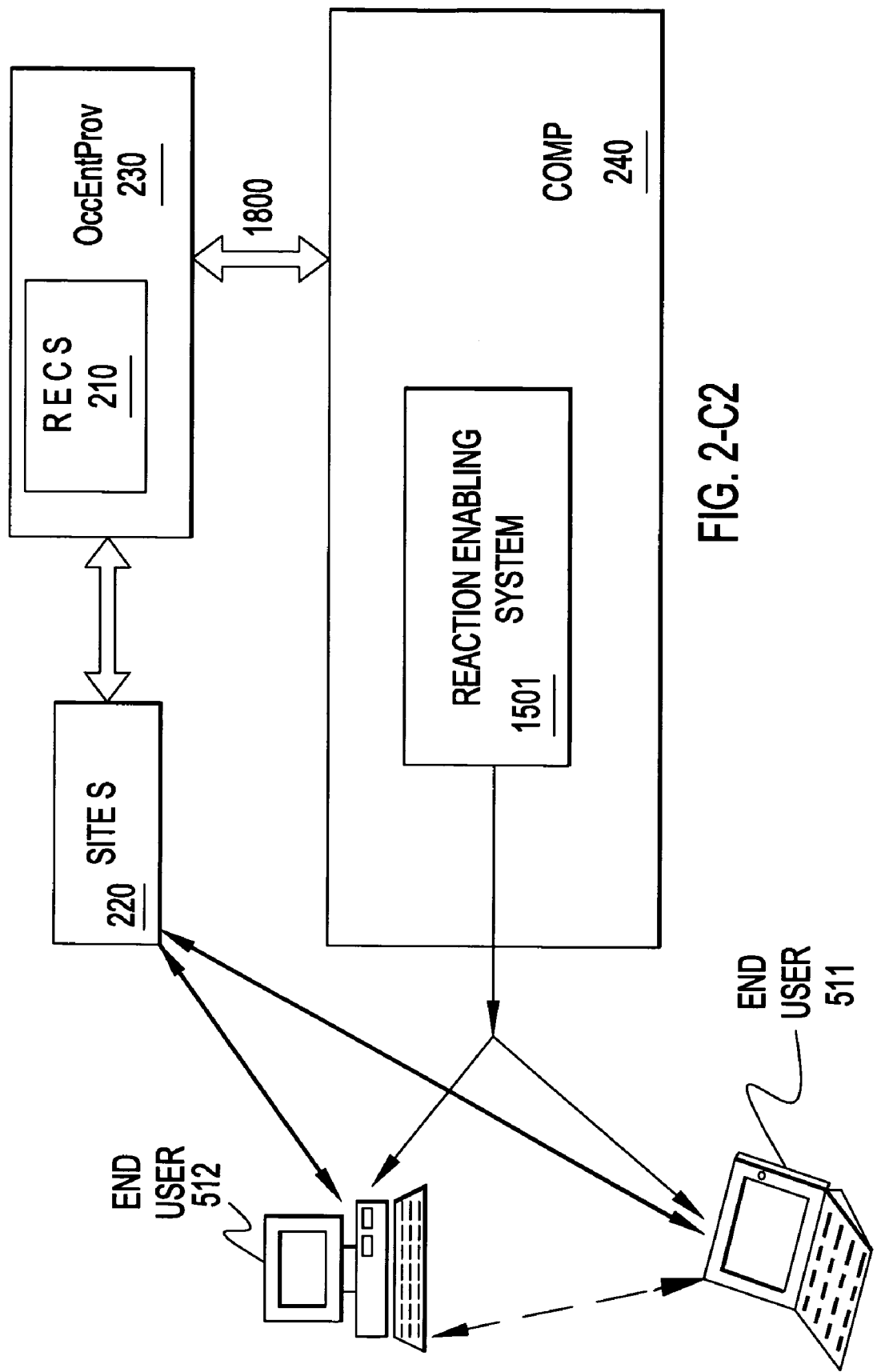
FIG. 2-C2

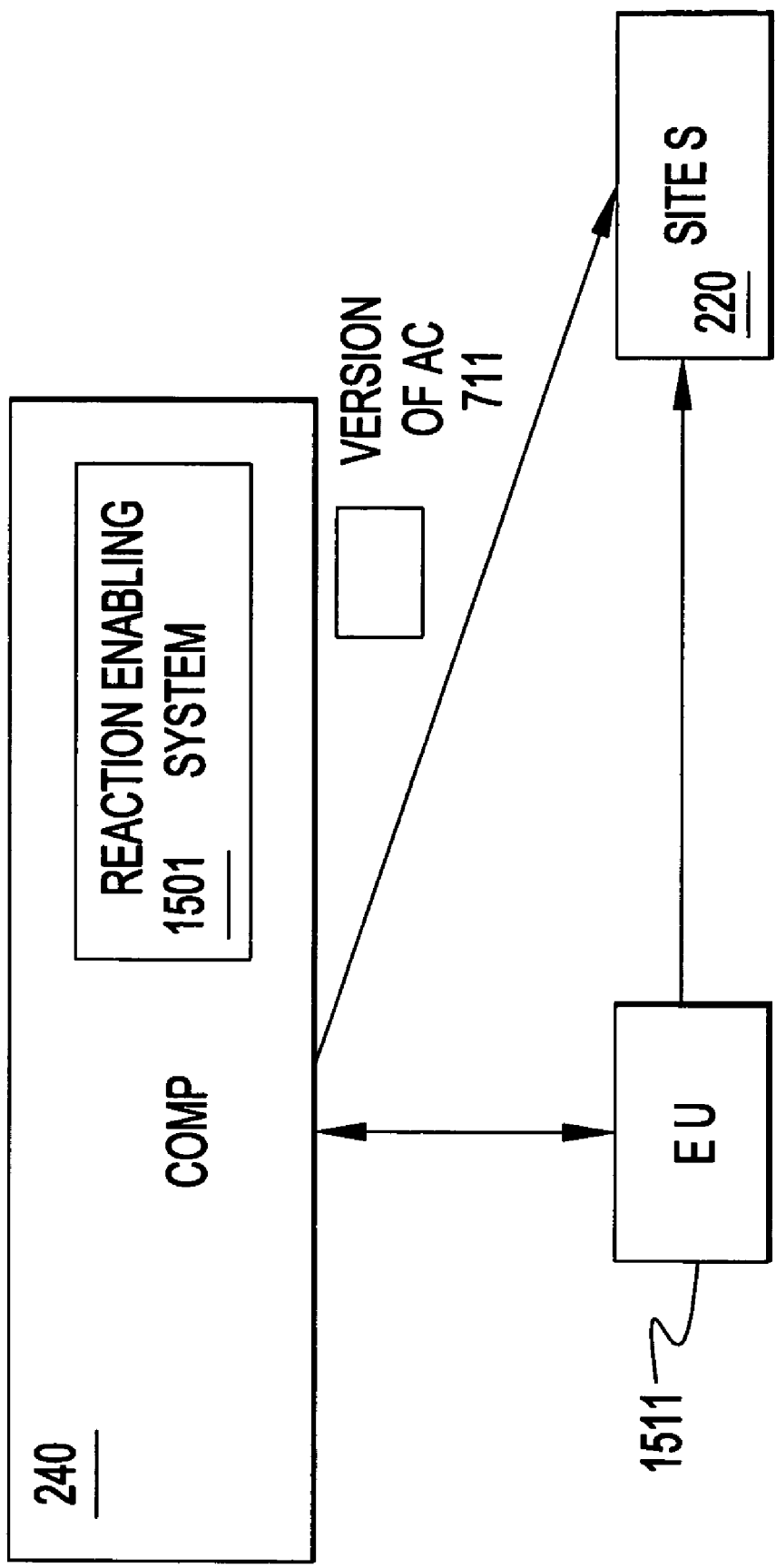
FIG. 6-B

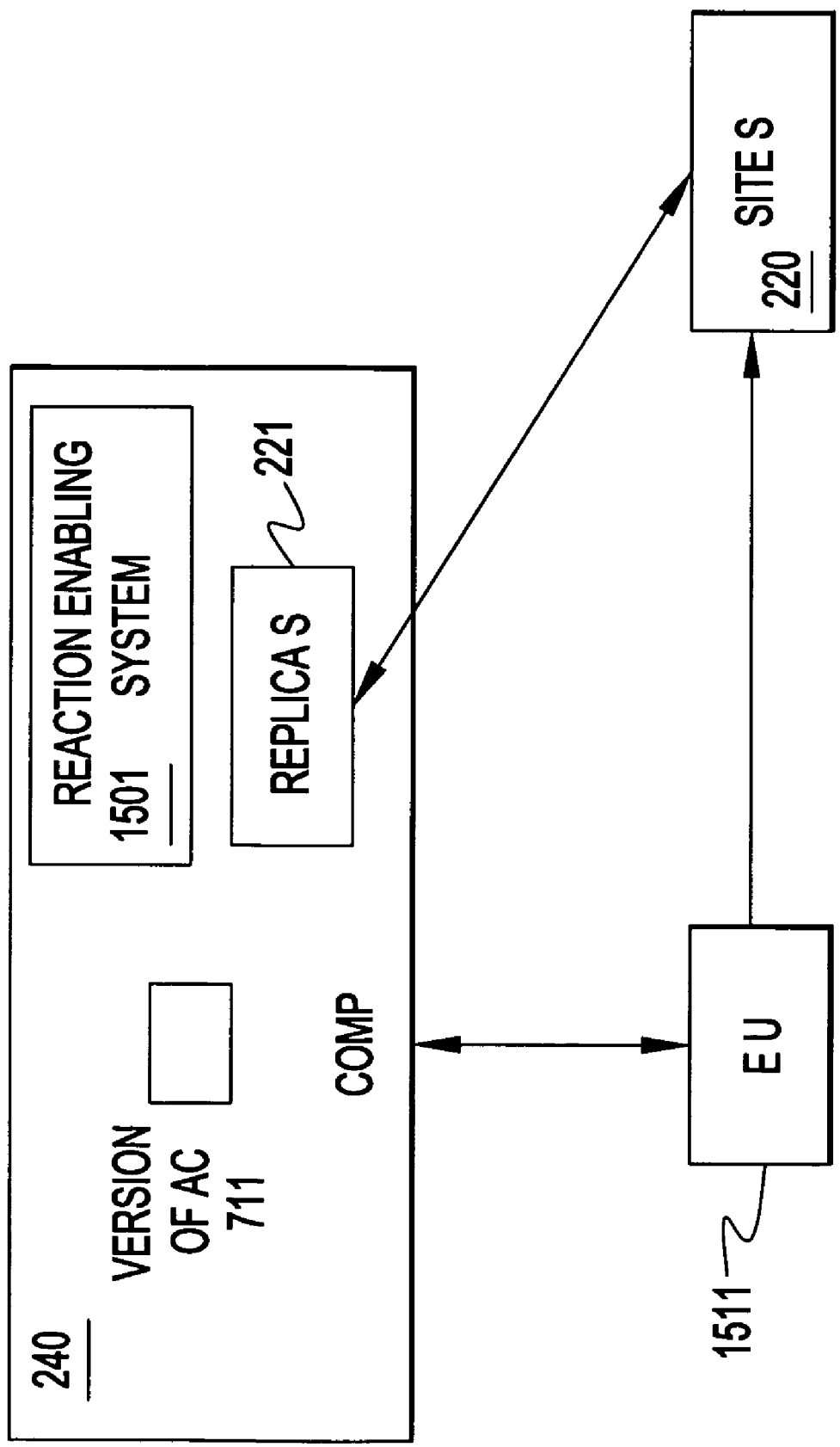
FIG. 6-C

SYSTEM, METHOD, SERVICE METHOD, AND PROGRAM PRODUCT FOR MANAGING ENTITLEMENT WITH IDENTITY AND PRIVACY APPLICATIONS FOR ELECTRONIC COMMERCE

BACKGROUND OF THE INVENTION

1. Field of the Invention

This invention relates to an improved system, method, service method, and program product for defining and/or managing entitlements and/or authentication entitlements in a computer networking environment.

CROSS REFERENCES AND RELATED APPLICATIONS

Priority is claimed to a related patent application, entitled "A SYSTEM AND METHOD FOR PROVIDING ONE OR MORE FUNCTIONS TO REACT TO AN ALERT AND REACH APPROPRIATE SITES OR PEOPLE", by Carolyn Brodie, Ernest Legrand, Maroun Touma, Charles Tresser, Catherine Wolf, Steven Woodward (Filed on Oct. 27, 2000 as U.S. patent application Ser. No. 09/698,424). This patent application is herein incorporated by reference in its entirety.

2. Description of the Prior Art

Push technology, described for instance in U.S. Pat. No. 6,123,737 to Sadowsky, can be significantly enriched by extending systems to enable response and collaboration as was done in an architecture called ContactPoint. (See also BackWeb; A Cooperative Architecture for a Flexible "Push-Pull" Broadcasting Solution, March 1997, USA, published on the World Wide Web and www.backweb.com.) These references are herein incorporated by reference in their entirety.

An embodiment of the overall architecture of Contact-Point, is represented in FIG. 1 which is described in further detail in the accompanying related patent application referenced above. With reference now to FIG. 1, a preferred embodiment of the ContactPoint system comprises a ContactPoint Client at 511, 512 and 571 and a ContactPoint Server 501 (that may comprise a Collaboration/Messaging Server at 551, a Users Directory at 537, the Content Server at 561, a Alert Management Server at 535, a Alert Database at 531, and a Alert Distribution agent at 533). The server 501 also may include a System Administration interface at 520 that is mainly used for creating/managing users and alerts. In FIG. 1, preferred choices of 520, 535, 537, and 551 are indicated as a system administrator 520, WebSphere 535, a Lightweight Directory Access Protocol (LDAP) 537, and a Sametime/MQ series. (WebSphere and Sametime are trademarks of the IBM Corporation.) Also, there are one or more teams of Support Staff and/or Domain Experts at 571, and/or facilitated contacts between customers/end users (see the dotted arrow between 511 and 571), and/or facilitated contacts between customers/end users as part of a community (see the dotted arrow between 511 and 512) to offer all advantages of the reaction-to-alert function as part of the overall organization. Notice that the dotted arrows represent interactions that will generally be mediated by the Collaboration/Messaging Server at 551.

The ContactPoint client (at 511, 512, and 571) is an application that runs on the end users' device (for instance a PC or some wireless device) and manages all users' interactions with the system (Acknowledging/viewing alerts content, submitting queries, issuing transactions, etc.). The ContactPoint client in particular preferably implements the following functions:

1) Logging the user on to the server whenever a physical connection is available (this is done in a way that is transparent to the user),
2) Interfacing with the messaging system for receiving alerts and related content,
3) Replicating and locally managing the alert content,
4) Creating the necessary effect for alerting the user to new events and content,
5) Invoking the proper application for rendering the alert content (the alert content distributed to end users could be in any format supported by the platform the client is running on),
6) Presenting the user with the right set of tools available within the context of each alert (i.e., a customized list of people or subject experts he/she can call or chat with, a customized calendar of events related to the alert, a multiple choice check list indicating the user's interest or lack of interest in the article or the product being promoted, standard preferred tools pre-selected for each form of alert, possibly depending on the customer profile, etc.),
7) All functions described in points 1, 2, 3, 5, and 6 above are well known and could each be easily implemented by anyone trained in the arts of programming and networking. Function 4 has been described above and the corresponding implementation is also known art.

The ContactPoint Server (at 501) includes:
1) The Alerts Database (at 531) that contains the definitions of the different components for each alert:
   i) alert dependent Visual/Audio means to communicate that there is new content when the alert is first received by the user,
   ii) the alert priority relative to other alerts in the system,
   iii) possibly-the URL to the actual alert document (this could be a document on the current server or a remote server on the web), and
   iv) the list of users the alert is intended to with the status for each user such as "Pending", "Received", "Viewed",
2) the Alert Distribution Agent at 533 that manages the distribution of the alerts based on their priority and the user current status (connected or off-line) and possibly the user priority. The alert distribution agent will for instance always attempt to send the latest alert submitted first and reiterate on the older alerts only after the most recent one has been acknowledged by the user. Each alert will preferably be stamped with a deadline or freshness date that determines when the alert becomes obsolete and should be discarded if not transmitted by the given deadline. Since the users may not be connected at all time, the alert distribution agent will preferably be able to detect when the user connects to the system and whether the alert was successfully transmitted before the user disconnects from the system. If some user fails to receive too many alerts, according to some predetermined tolerance, a message may be sent to the system administrator, who may then try to contact the end user, or take some other actions.
3) The Alert Management Server 535 that implements a set of tools that the System Administrator 520 uses for managing user profiles and defining the alerts and the Alert Distribution Schedule. These tools include a web interface for adding users to the system, creating groups of users and assigning users to each group, and defining user profiles that will subsequently be used to decide what alert or type of alert a given user or group of users should receive. Further interfaces are available for defining the alert components such as the visual effect the client should produce when the alert is received, the full document of the alert, the alert expiration date, the subject expert assigned to the alert, and the most appropriate communication medium (i.e. text chat, voice chat, e-mail, audio/video conferencing, etc.) that the alert recipient can use to start a collaborative session with the subject expert. The Alert Management Server 535 also allows for grouping of alerts so related alerts can be sent simultaneously to provide a more complete view of a particular event. It also provides the administrator with a global view of who received any particular alert, and when, and means for defining alert priorities so the delivery of a more recent alert can follow or proceed a previously pending alert.

4) the Content Server 561 is a repository of documents that include the main body of the alert and other related documents that need to be replicated to the alert recipient's local environment or local device used for receiving and viewing the alerts. These documents could include links to external documents that do not reside on the content server and therefore are no replicated to the alert recipient's local environment.

5) the Users Directory 537 lists all the users that can log in to the system and their identifiers (IDs). In addition, it preferably includes a user profile that defines the user interest for targeted information and possibly other parameters, such as priorities as defined by the price paid for services, and/or depending on the value of the customer for the. ContactPoint operator. The User Directory can be implemented on top of such directory standards as the Lightweight Directory Access Protocol (LDAP) or other directory services.

6) the Collaboration/Messaging Server 551 allows two or more users to engage in real-time collaborative activities such as chat or document sharing. It also implements the messaging protocol since an alert can be viewed as a message sent from an automated user (the Alert Distribution Agent at 533) to the end users (511, 512 and 517), be they customers (like at 511 or 512) or part of the organization (like at 571).

The System Administrator 520 is responsible for creating and maintaining the user IDs and the Alerts Database at 531, using, for instance, a Web Browser as a System Administration Interface at 521.

Databases and a variety of documents production tools can also be part of the tool kit at 520, or integrated with the Alert Management Server 535. All of the logic for administering the system is preferably implemented as Java servlets running inside of WebSphere (as an example of server that can support ContactPoint.) WebSphere is a product and a trademark of the IBM Corporation), and, for our purposes, supports the following functions:

SA1) Creating a new User Id and user profile,

SA2) Creating the alert including the visual effect produced by the client as well as the alert content and priority, SA3) Associating subject expert at 571 with the particular alert, SA4) Specifying related link with additional information, and/or actions access and further tools the alert recipient can use to respond to the alert, SA5) Creating one or a plurality of virtual communities for some or all alerts, Function SA1) is an administrative function once proper verification of user qualifications has been made. Such verification can be done in many ways and is rule dependent: for instance every user may qualify, or the user must give some credit card information, or the end user may need to be a regular customer, etc.

Function SA2) can be of varied nature.

In one extreme case, alerts are created from analyzing news. Then a news feed will bring news from some sort to the Alert Management Server at 535. In the case of market data for instance, the type of news that should be isolated as events (which we defined as actual or potential alert contents or alert content components) may be identified automatically. Examples of events are provided by stock prices passing some preset barrier and/or showing some jumps above some fixed level on or under a preset interval of time. The alert content can be also determined by simultaneous data, or successions of events rather that single data points. Some or all of the parameters that define an event may be fixed differently by different end users, in which case 520 will access 537 to retrieve such user information. The form of the alerts that will be sent can be very uniform and consist of just the event displayed in some predetermined format or some rule can be designed where the alerts are chosen depending on classes of events. For instance, the color of the background of the message can be determined by the amplitude of a price differential in the case of market data. A human agent can either have the means to overrule the automatic decisions, or fully be in charge, depending on the type of business.

In the other extreme, where the appearance of the alerts is as important or more important than the significance of the events, each alert may be completely composed by human agents which may spend lots of time and money to create content elements such as video-clips and other forms of multimedia content.

PROBLEMS OF THE PRIOR ART

While the prior art described above does provide a highly useful method for distributing targeted information to members of a distributed community and providing them methods for collaborating with experts within the context of the information, it does not meet an organization's need for generic easy access to secure WEB sites or other secure services delivered on a public or private network, "i.e., those situations that require "entitlements." Secure web sites have complicated access (entitlements), requiring for instance:

Subscription access control, where examples of access control mechanisms include:

Passwords certificate based access control cryptography based access controllers (as can be implemented for instance by using smart cards), biometrics RFIDs payment and/or recognition of the IP address or class thereof.

Typically, the user of a secure web site has to use a user ID/password or a personal digital certificate to identify himself/herself to one or more web site servers. However, there may be situations where the user:

1. does not want to disclose his/her identity,
2. has no right to disclose his/her identity (as disclosing it may for instance influence some judgment or appreciation of the work done by this individual on the basis of knowing his/her identity),
3. has no time to subscribe to a useful site in response to an alert,
4. does not wish to pay for a subscription to a site he/she may use only once, or would only use under improbable and/or exceptional circumstances,
5. needs to share the service with one or more co-workers and the service is for a fee by amount of time used, so that a better contract can be negotiated if the total time of access is controlled instead of individual times of access, etc.

The functionality described in the prior art does not meet these needs.

Some prior art like the HTTPS/SSL protocols are security protocols, not a privacy protocols. An HTTPS transaction starts with the browser encrypting the id/password of the user who is signing in and submits it to the server. Once the identity of the user is established, a token is used to refer to that session. HTTPS authenticates the user by having her disclose her identity.

ASPECTS OF THE PRESENT INVENTION

An aspect of this invention is an improved system, method, service, and program product for defining and/or managing entitlements in a computer networking environment.

Another aspect of this invention is an improved system, method, service, and program product for apportioning of resources used in a computer networking environment.

A yet another aspect of this invention is an improved system, method, service, and program product for defining and/ or managing security and/or authentication entitlements in a computer networking environment.

SUMMARY OF THE INVENTION

The present invention is a system, method, service method, and program product for defining and/or managing entitlements and/or authentication entitlements to resources in a computer networking environment. Upon receiving one or more dynamic events, the invention verifies one or more users (a selected user) has (entitlement) attributes that satisfy one or more access criteria to access one or more resources. The invention then permits and/or provides access to one or more resources for the selected user over one or more networks without revealing the identity of the selected user to the resource provider.

BRIEF DESCRIPTION OF THE DRAWINGS

The foregoing and other objects, aspects and advantages will be better understood from the following detailed description of preferred embodiments of the invention with reference to the drawings, in which:

FIG. 2, comprising FIGS. 2-A, 2-B1, 2-B2, 2-C1, and 2-C2, illustrates a series of commercial context-dependent block diagrams representing examples of preferred embodiments of the present invention.

FIGS. 6, 6B, and 6C are flow charts representing preferred embodiments of how the present invention can provide users with alternative preferred access methods to entitlements.

DETAILED DESCRIPTION OF EMBODIMENTS OF THE PRESENT INVENTION

Figure 1:
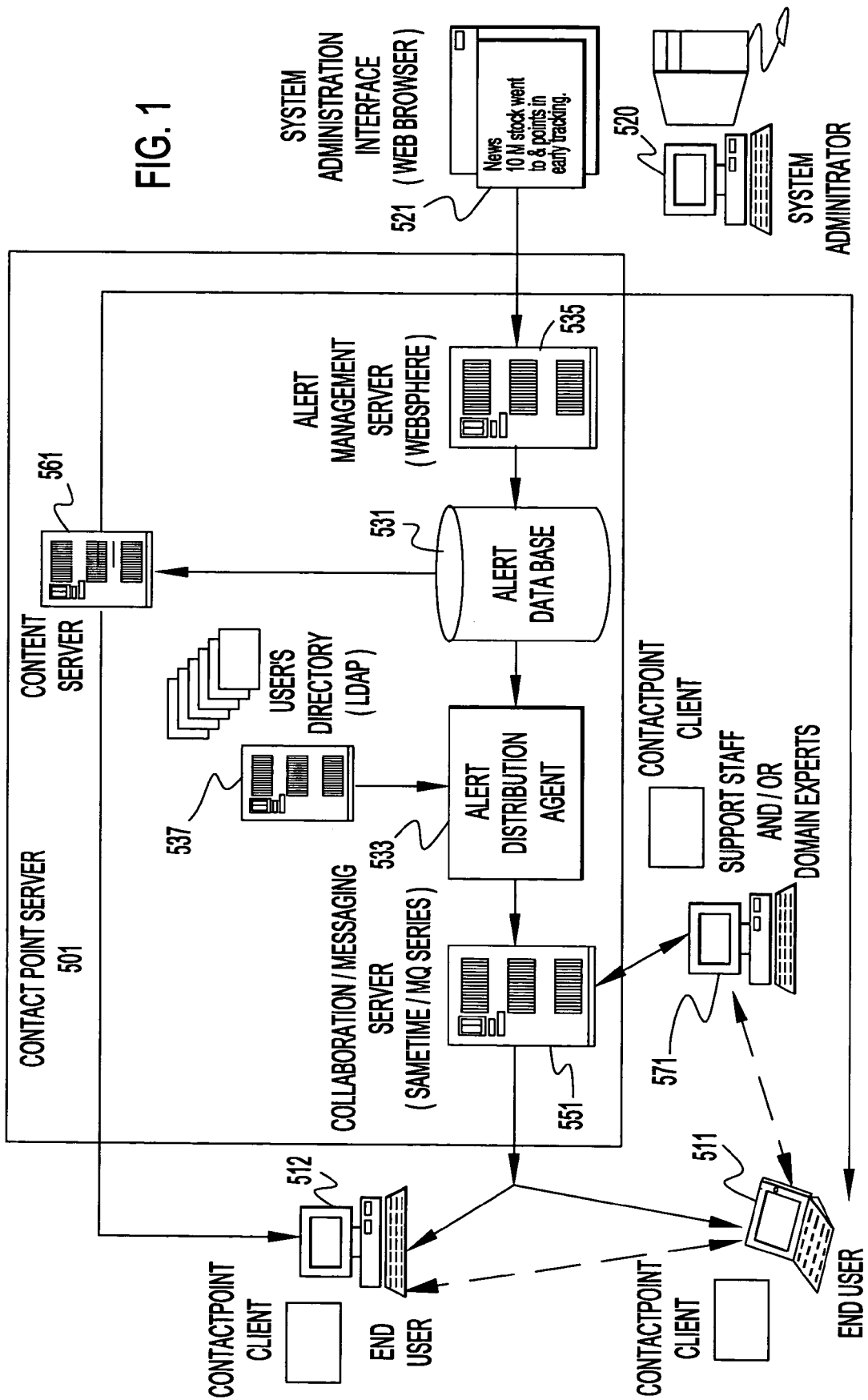
FIG. 1 is a block diagram of a prior art example of an overall architecture of ContactPoint.

Organizations have a need to distribute occasional entitlements to their customer and/or employees to allow them to access websites and services. Exclusive and protected web sites also use entitlements. Organizations sometimes need to provide their customers and/or employees with means to easily get access to these otherwise exclusive and protected web sites or other services and/or information provider on a temporary basis according to some criteria. One aspect of the present invention manages these entitlements while protecting the privacy of the user. The invention has commercial advantages of many sorts, including the ability to negotiate more favorable contracts to provide these accesses.

To allow the user to remain anonymous while ensuring security, as well as to overcome other difficulties in the prior art, the present invention uses a reaction enabling system, ContactPoint (as a non limiting example), and extends access control in this system, such as digital certificates, to provide entitlement to selected users or beneficiaries. In some embodiments, an enabled/entitled user or group of users of the web site (or other service) can request access to a site (or to a service) based on an invitation received from the reaction enabling system but the users are not required to disclose their identity or group identity, pay a fee, or be otherwise inconvenienced or slowed down by access control.

The company that owns the web site and/or is providing the service/resource does not have to be the issuer or manager of an entitlement (e.g., certificate). The issuer/manager may be a company that operates the reaction enabling system server or another company that had forged some sort of partnership or negotiated special rates with the owner of the web site or service provider to provide the reaction enabling system as a specific service (resource) for the customer.

Unlike service aggregation (such as the online bill payment disclosed in U.S. Pat. No. 5,383,113: "System and Method for Electronically Providing Customer Services Including Payment of Bills, Financial Analysis and Loans") that requires the user to negotiate his own contract with the firm providing services (for example a utility company) and then to enter the parameters of his contract (such as his/her name, the company's name and account number in the database of the service aggregation web site), the present invention offers the firm (in this case the utility company) the ability to extend its offering of online payment to the ContactPoint users (or users of any other architecture supporting this invention), in a way that is transparent to the user and in a way that keeps user identity private.

Reference to FIG. 2 discloses embodiments of the present invention that can be used in a context where different entities (or classes of entity), some of which may be part of a bigger entity, interact. As shown in FIGS. 2-A through 2-C2, the example parties are:

a company COMP 240, that wants (occasional) entitlements to be provided to its customers, its employees, or a combination of both (end user 511, 512), the provider of occasional entitlements to the users of some sites or services, OccEntProv 230, the server (or servers) that provides services and/or resources to users who should receive access to sites, products, or services and optionally tracks the usage of those sites, products, and services using a Resource Entitlement Computer Server (RECS) 210. The sites, services, and/or products (resources) S 220 may, as non limiting examples, include: a corporate resource, a financial account, a database, a information database, a medical database, a corporate database, an employee corporate benefit database, a computer application, a service, a right to performance, a right to order from a vendor, an order for a product, a subscription, a service for a term, a method of accessing a resource, a document, a financial document, a medical document, a medical record, an educational document, an insurance document, a tax document, a financial service, a tax service, a government service, an accounting service, an insurance service, a health service, a real estate service, an educational service, an interaction with a third party, an engineering service, a corporate service to an employee, a reduced price, an order from a vendor, and one or more contract terms.

a reaction enabling system 1501 which alerts users to new entitlements and provides them with methods for accessing those entitlements.

These entities (210, 220, 230, 240, 1501) can be separate, combined, and/or related to each other in multiple ways as depicted as examples in FIGS. 2-A through 2-C2.

Entitlements are managed using, the RECS 210, which can either be:
1. Part of COMP 240 as represented in FIG. 2-A, for example, where COMP negotiates 1800 a contract with S 220. In this case, the reaction enabling system 1501 is a service offered by COMP 240 and is used to provide the END USERS 511 and 512 with access to the (entitled) resource 220. Note that the contract can be negotiated 1800 using prior art methods, e.g., face-to-face, by e-mail or phone, or by using prior art automated negotiation tools.
2. Part of OctEntProv 230 which contains S 220 and the novel RECS 210, as represented in FIG. 2-B1 and in FIG. 2-B2. In this preferred embodiment, the COMP 240 negotiates 1800 a contract with OctEntProv 230. The contract negotiation 1800 occurs in a normal prior art manner. Also see the description of FIG. 3 below. In some embodiments, the contract defines users (511, 512, 12103), access criteria 12106, entitlement attributes 12124, events 12112, and any rules that might be necessary in the entitlement process 12100. The reaction enabling system 1501 is a service offered by COMP 240 as in FIG. 2-B1, or by OctEntProv 230 as in FIG. 2-B2. The reaction enabling system 1501 provides access to the resources (e.g. services) from Site S 220 to the END USERS 511 and 512.
3. Part of OctEntProv 230 which is independent of S 220 as represented as alternative embodiments in FIG. 2-C1 (reaction enabling system 1501 part of the OccEntProv 230) and in FIG. 2-C2 (reaction enabling system 1501 part of the COMP 240). In these embodiments, the COMP 240 negotiates a contract with OccEntProv 230 which provides Services from Site S 220 using a novel RECS 210 through the negotiation 1800. Here OccEntProv negotiates (as in the prior art) 1700 a contract with S 220 for the services provided to users 511 and 512. The reaction enabling system 1501 is a service offered by OctEntProv 230 as in FIG. 2-C1, or by COMP 240 as in FIG. 2-C2. The reaction enabling system 1501 then provides access to the services 220 to the END USERS 511 and 512 or alternatively allows the users 511 and 512 to access the services from Site S 200 directly. Note that the contract can be negotiated 1700 using prior art methods, e.g., face-to-face, by e-mail or phone, or by using prior art automated negotiation tools (see for example electronic stock markets).

While this disclosure novelly uses the ContactPoint architecture to help describe various preferred embodiments for the RECS 210, it should be understood that the invention is not limited to the scope and applicability of the ContactPoint architecture.

Figure 3:
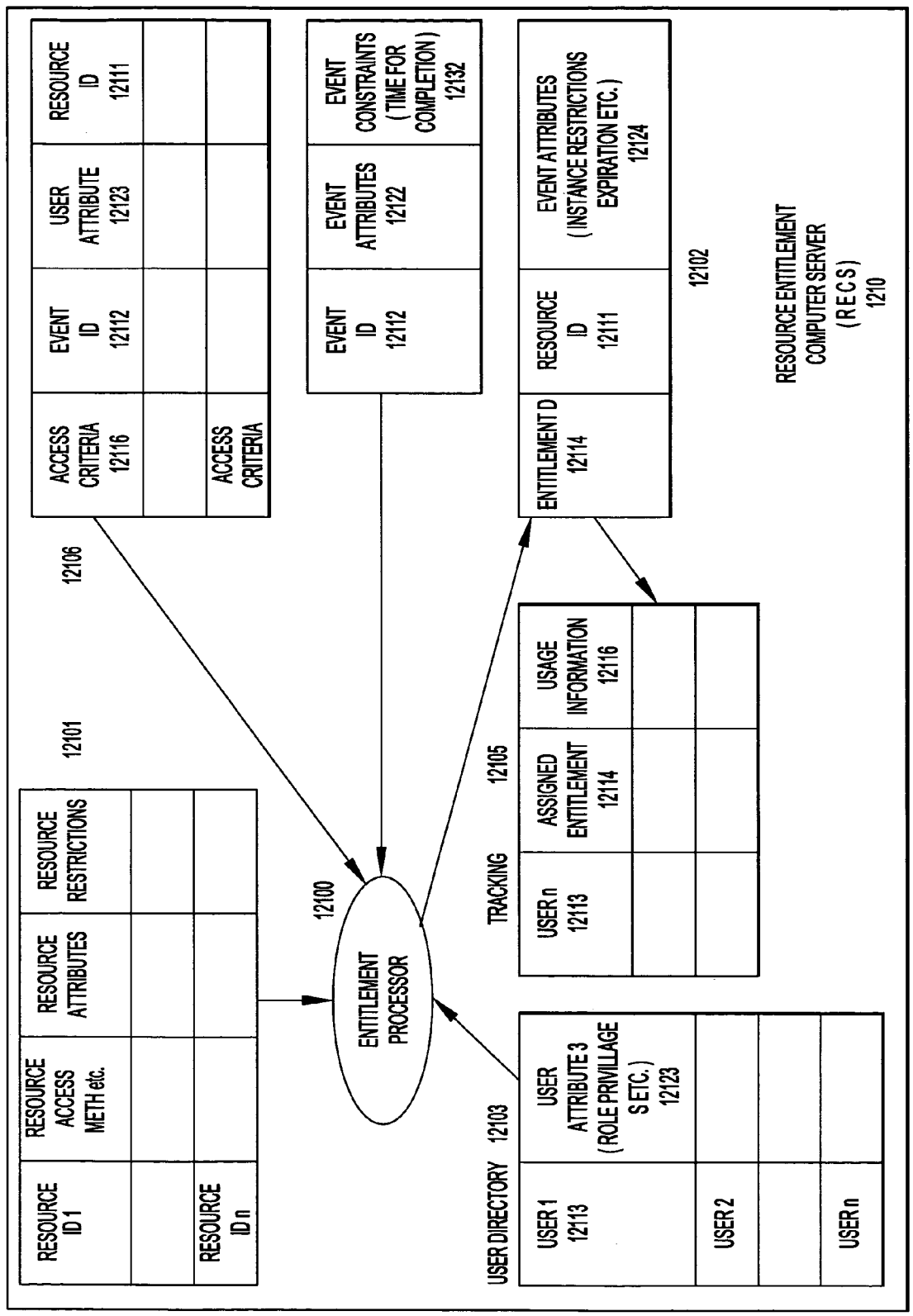
FIG. 3 is a block diagram of one preferred architecture of the part of the present invention called the Resource Entitlement Computer Server.

FIG. 3 shows one preferred embodiment of the RECS 210 used in FIGS. 2A-2C2 that is labeled 1210 in FIG. 3. RECS 1210 enables the use of dynamic events and user attributes to determine which users should be given access to resources and which users should be notified of the availability and methods for using these resources, e.g., for a set period of time. The RECS 1210 grants selected users (511, 512) permission to access resources 220 without disclosing the identity of the selected user (511, 512).

One embodiment of the RECS 1210 comprises a data structure that preferably includes or uses a resource data structure 12101 that contains the definitions of the resources that the RECS 1210 manages. In a preferred embodiment, the resource data structure 12101 includes: a resource identifier 12111, one or more resource access methods 12121; one or more resource attributes 12131, (such as whether the resource is a utility or an informational web page); and possibly one or more resource restrictions 12141.

The preferred RECS 1210 also has an access criteria data structure 12106 that preferably contains or uses the description of a set of access criteria defining how entitlements should be granted. A preferred access criteria data structure 12106 contains an access criteria identifier 12116, an event id 12112, one or more user attributes 12123, and a resource identifier 12111. The preferred RECS 1210 also has a dynamic event data structure 12102 that preferably includes or uses a description of the dynamic external events including an event identifier 12112; one or more event attributes (such as priority 12122), and event constraints 12132 (such as a time of day, a date, a duration of use, a level of access of the resource, a level of availability of the resource, an accident, a reported error, a user request, a number of uses, a number of users accessing the resource, and a policy change.) These dynamic external events trigger an entitlement process (processor) 12100.

The preferred RECS 1210 further has a directory of users 12103 that preferably includes one or more user identifier(s) 12113 and one or more user attributes 12123. The user data structure 12103 designates users who could be assigned the entitlements defined in an entitlement data structure 12104.

A preferred entitlement data structure 12104 contains an entitlement identifier 12114, a resource identifier of the associated resource(s) 12111, and zero or more entitlement attributes 12124 (such as expiration date and constraints.)

Finally, the preferred RECS 1210 has an optional tracking data structure 12105 that preferably includes or uses a user identifier 12113 of users that could be assigned entitlements, an assigned entitlement identifier 12114, and usage information 12115. Usage information (resource use information) 12115 may include but is not limited to: a statistic, a resource use statistic, a user attribute statistic, a number of times the permission is granted, a number of times the permission is granted to one of the single users, a duration of grant of permission, a number of times the permission is used, a duration of use of the resource, a level of permission resource being granted, a level of resource being used, a payment amount, a payment method, and one or more attributes of the user.

In a preferred embodiment, the tracking data structure (12105) preferably includes or uses the tracking of entitlements based on the access criteria defined in structure 12106. Alternatively, the tracking data structure 12105 tracks usage of resources or other historical information. In one embodiment, the fact that usage information 12115 is captured in the tracking data structure 12105 can be used as a service or information that can be provided under terms of the negotiations of services (1700, 1800). Therefore, in some embodiments tracking information records only those resources used so that the user (COMP) only pays for such resources used.

The resource data structure 12101 and user directory 12103 do not have to be internal to the system but could exist in a remote location on the network, provided a secure protocol, such as a Secure Socket Layer (SSL) or https, exists for data encryption and/or privacy. The dynamic external event descriptor 12102 can be authenticated as to the origin of the event, using digital signature for example and the nature of the event from the event attribute field 12122 that is in the event data structure 12102. Further routing of the event to a peer RECS is possible if the event cannot be handled by this instantiation of RECS. In a preferred embodiment, the dynamic external event 12102 description includes the identification tag of the event 12112, its attributes 12122, and/or any constraints 12132, such as time for completion or level of user privilege required for handling such an event.

In a preferred embodiment, upon receiving such an event, the entitlement process 12100 uses any set of known rule-based logic and/or a matching algorithm to correlate one or more events 12112 to one or more resources 12111 and users 12113 that require the respective resources 12111 for the given event 12112. In alternative embodiments, access to the resources 12111 can be enhanced and/or restricted as determined by one or more other factors such as: resource access method 12121, resource attributes 12131, resource restrictions 12141 event attributes 12122, event constraints 12132, and/or user attributes 12123.

In one preferred embodiment, the event (e.g., by event ID 12112) is associated with one or more resources (e.g., identified by resource ID 12111) by using the access criteria 12106. The access criteria 12106 (which, for example, is defined for an event ID 12112, User attribute 12123, and/or resource ID 12111) associates a resource ID 12111 and user attributes 12123 to users who should have access (selected users) to particular resources with a given event (e.g., defined by event ID 12112). Note also factors like event constraints 12132 (event attributes 12122) are used in some preferred embodiments to define constraints or allow broader use of the resources. For example, event constraints 12132 (event attributes 12122) can define the beginning or end of the time 12132 for which the given user(s) is allowed access to the resource (a level of resource 12111 required 12122) to an available resource from the list of resources 12101. The resource use, in some embodiments, is broadened and/or constrained by one or more other factors, associated with the resource, e.g., resource access method 12121, resource attributes 12131, and/or resource restrictions 12141.

The User directory 12103 contains the list of users and their attributes (such as role or level of privilege) who could be provided the entitlement. The resource use, in some embodiments, is broadened and/or constrained by one or more other factors, associated with the user, e.g., user attributes 12123 like user role, title, privileges granted, etc.

The tracking preferably is done by adding entries to the tracking data structure (12105) each time an entitlement defined in the entitlement data structure (12104) for a resource defined in the resource data structure (12101) is granted to a user from the User Directory (12103) based on the access criteria defined in the access criteria data structure (12106). Therefore, the tracking 12105 data structure associates a user or set of users to one or more entitlements to resources 12114 required to access a given resource (defined by resource ID 12111). The users are selected by their association with the triggering (dynamic/external) event 12112 and resource 12111 subject to the users meeting any broadening/constraints related to event (12122, 12132), resource (12121, 12131, 12141), and user (12113, 12123).

The tracking data structure can log usage information 12115 about the resource to track the extent that the resource is being used, by whom, and/or for what purposes. For example, usage information might determine that a resource that is poorly used should be improved or that a resource that is used extensively should be increased in price or used as a model for other resources. This information can also be used in the contract negotiation discussed above.

The method for accessing the resource is contained in the resource data structure 12101. When an event that matches one defined in the event data structure 12102 occurs, the access criteria data structure 12106 is examined to find the resource that should be provided to users and the attributes of the users who are to receive the access to the resource. In some preferred embodiments, the resource data structure 12101 is examined to find more information about the resource including access methods. The user directory data structure 12103 is examined to find the ids of users that have the attributes defined in the access criteria data structure 12106. Once users are found, entries are entered into the tracking data structure that define the resource access that is provided to each user that met the user criteria.

In a preferred embodiment, unlike in the HTTPS/SSL protocol (which are security protocols, not a privacy protocols), one or more of the user attributes are carefully selected as not to disclose the identity of the user. In other preferred embodiments, user entitlements are based on the established contract between the owner of the service and the provider of the service. In other preferred embodiments, privacy is achieved by providing temporary credentials based on user attributes that are not linked to the user identity.

Figure 3A:
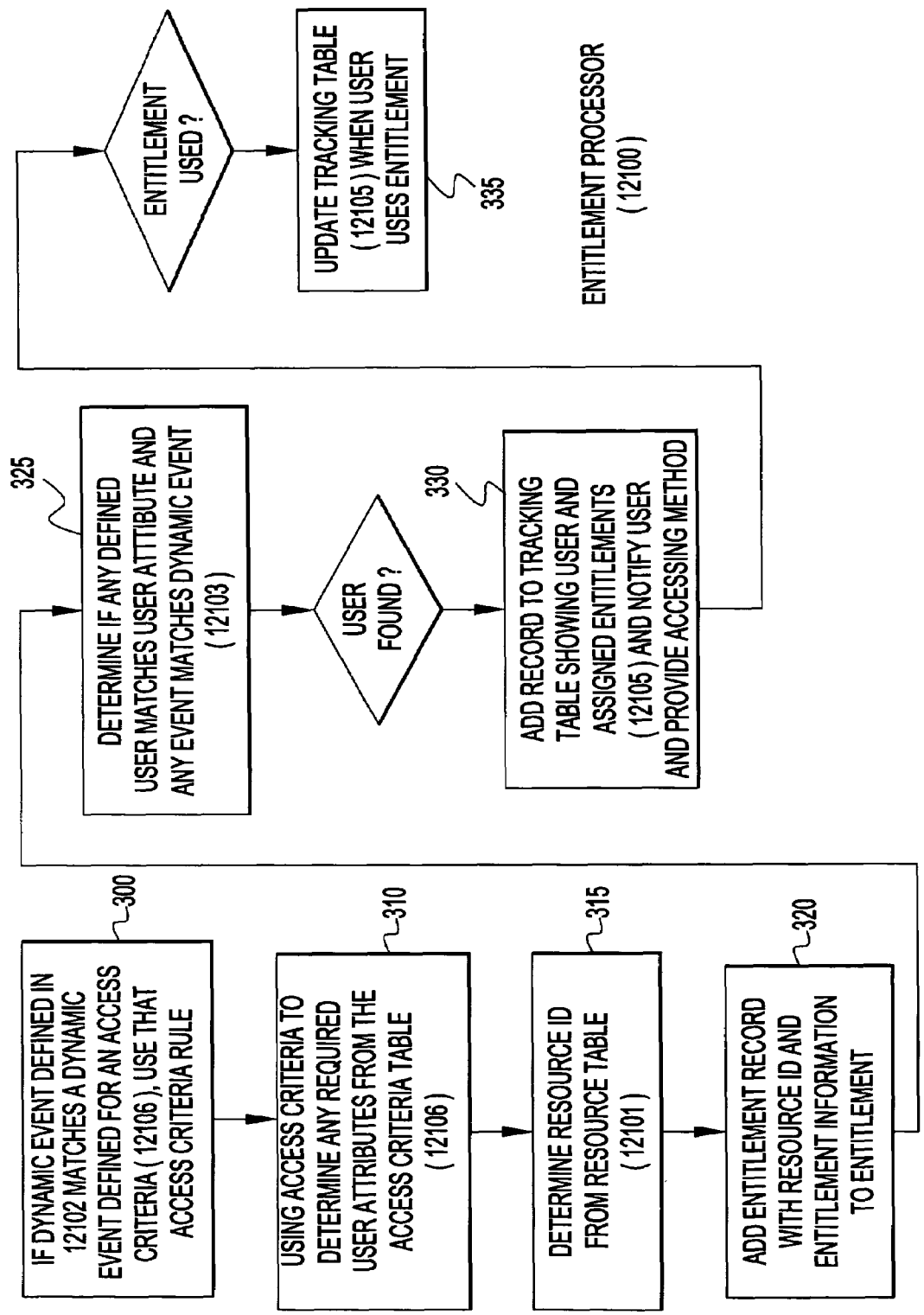
FIG. 3a is a flowchart describing one preferred method to implement the Entitlement Processors Resource Entitlement Computer Server.

One possible embodiment of the entitlement process (processor when executed on hardware) 12100 is shown in FIG. 3a. By way of example, an (dynamic/external) event, e.g., a corporate event, defined in 12102 could be triggered by a new promotion posted on a company C supplier web site. See step 305. The new promotion is available to users based on certain access criteria defined in 12106 and possibly external events defined in 12102. See step 310. One of the resources, defined in 12101 that may be required is the contract, possibly one of many that is negotiated using any well known negotiation procedures, that is desired to use to conduct the transaction. See step 315. At this point an entry is added to the Entitlement Record 12104, step 320. One or more users who have user attributes 12103 match the defined criteria are identified (selected users), step 325. While the identity of user U is not disclosed to the supplier web site, the assignment of the entitlement to user U is tracked in the tracking database 12105 for internal control and audit purposes, step 330. The user is notified of the entitlement and how to access it using a reaction enabling system 1501, step 335.

Note that because dynamic events (external events, e.g., identified by the event ID 12112) can be used to trigger entitlements, this can provide on-demand access to resources provided by a third party when the access attempt is defined as the dynamic event. Other external (dynamic) events (e.g., event ID 12112) include: a time of day, a date, a duration of use, a level of access of the resource, a level of availability of the resource, an accident, or a reported error, a user request, a number of uses, a number of users accessing the resource, a policy change, and/or any external event). In the preferred embodiment, each record in an access criteria data structure contains an event id, resource id, and user attributes. When the event occurs, the entitlement processors finds the access criteria record with the event id for the event that occurred. Then it looks for resources in the resource table that match the resource id in the same record and users in the user directory with the defined user attributes. This match of the resource record to an event that occurred using the information in the access criteria data structure is written to the entitlement data structure 12104 and then the mapping to individuals users is optionally written to the tracking data structure 12105.

Figure 4:
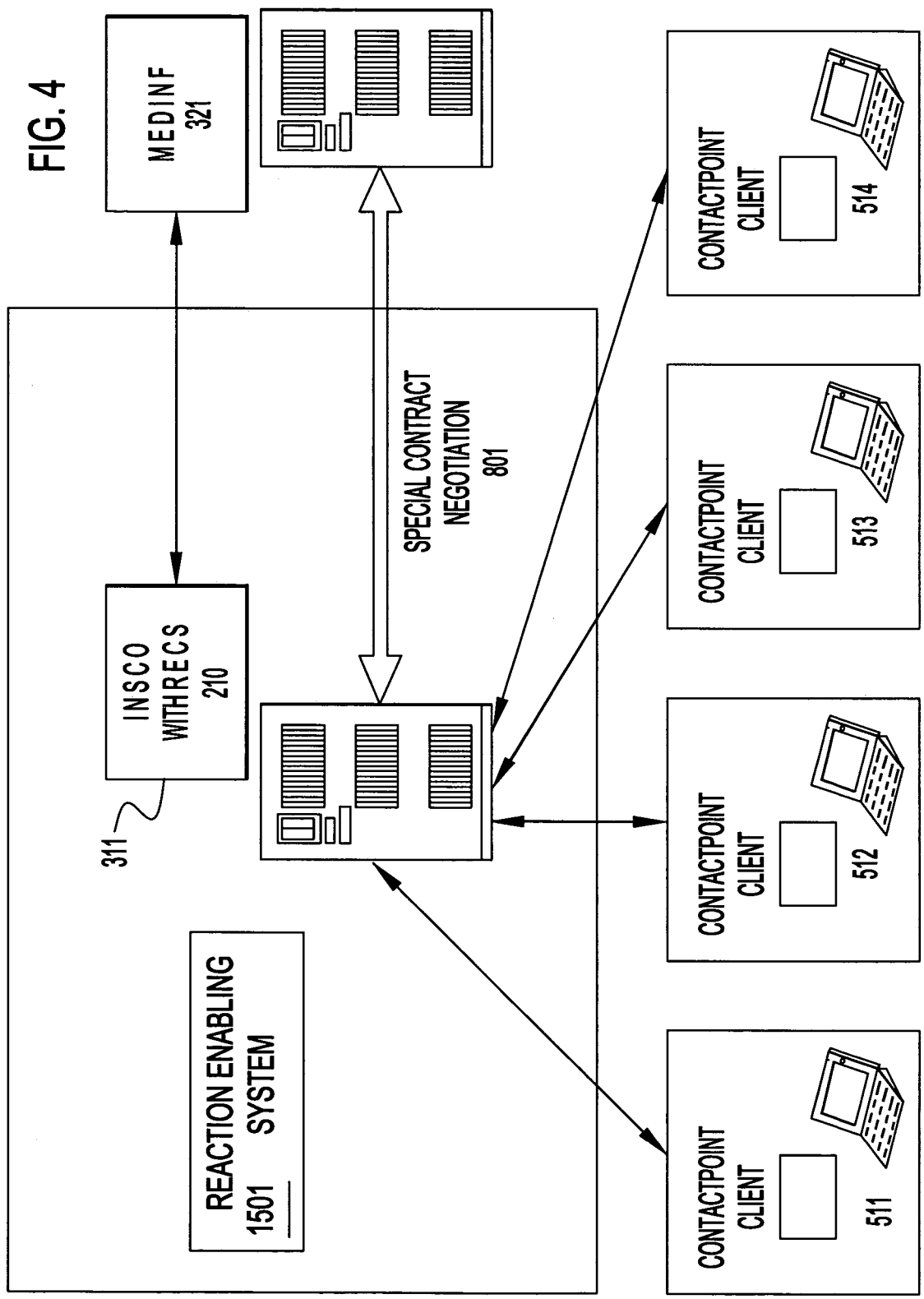
FIG. 4 is a block diagram illustrating an example commercial use of the present invention.

FIG. 4 is a block diagram illustrating an example embodiment of aspects of the present invention, as shown in FIG. 2*a*, where an Insurance Company offers access to a Medical Information provider after negotiating a special contract to this effect, in such a way that the customers of the Insurance company do not have to negotiate separate access rights to the Medical Information provider.

For example, according to the present invention, and with reference now to FIG. 4, an insurance company INSCO 311 (an example COMP 240) which has implemented a RECS 210 (shown as 1210 in FIG. 3) may offer its customers a free subscription to a fee-based medical information provider, MEDINF at 321 (representing S 220), using a special contract negotiation between the two parties at 801, for a limited time as an incentive to upgrade the policy. According to the present invention, using the reaction enabling system 1501 (that, for instance, may be 501 from FIG. 1), the subscription will allow INSCO's customers 511-514 to have access to information on diseases, conditions, treatments, and experimental therapies for a set period, for example a year (term), without providing any information about themselves to the medical information provider. This allows INSCO 311 to provide their customers 511-514 with extra services while protecting them from unwanted marketing information from MEDINF 321. The RECS 210 allows INSCO 311 to manage the entitlements. In this example, the RECS 210 would operate in the following way. Information about the medical information provider would be stored in the Resource Identifier data structure (12101 in FIG. 3 and 3*a*). Information about INSCO's customers would be stored in the user directory including their names and attributes such as the level of policy they have purchased (12103 in FIG. 3 and 3*a*). INSCO would define a dynamic event regarding the dates when access to the medical information provider that was negotiated will be available is stored in the dynamic event data structure (12102 in FIG. 3 and 305 in FIG. 3*a*) and the access criteria that specifies that this dynamic event id should be provided to users for whom an upgraded policy is stored in the access criteria data structure (12106 in FIG. 3 and 310 in FIG. 3*a*). An entitlement record is also added to the Entitlement data structure (12104 in FIG. 3 and 320 in FIG. 3*a*) detailing how access to the resource is to be provided. When the dynamic event specified in the dynamic event table (12102) (as a particular date) is reached, the entitlement processor (12100 in FIG. 3 and 325 in FIG. 3*a*) would match the data user attributes in the user directory (12103) with the access criteria (12106) and add entries to the Tracking data structure (12105) using the information stored in the entitlement data structure (12104) to define the access methods, restrictions, period of use, etc. The reaction enabling system 1501 would be notified that there are new entries in the tracking data structure (12105) and would notify the selected customers of both the entitlement and the access method. The access method would include temporary credentials to protect the end-customer's identity from the medical data provider.

Figure 5:
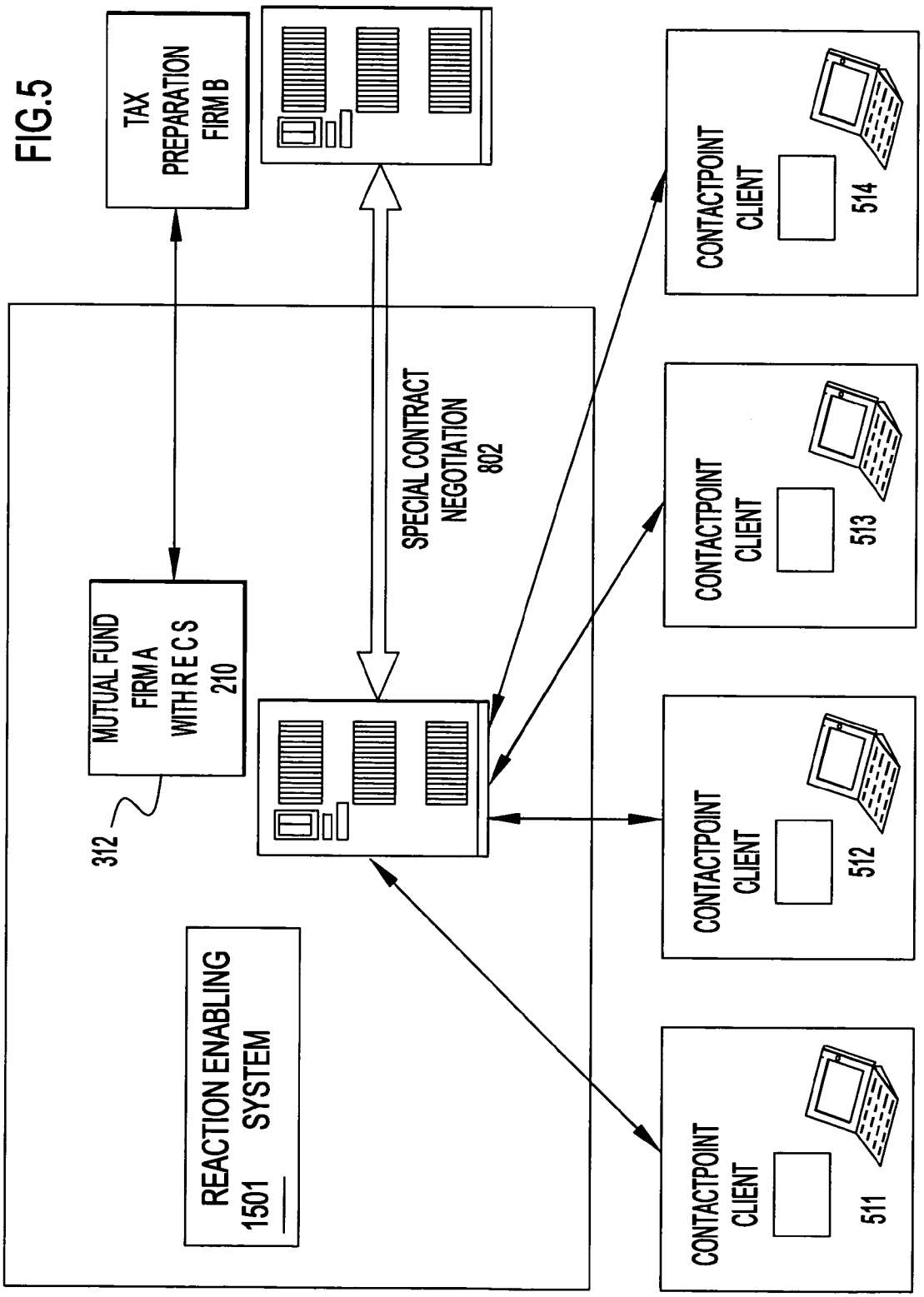
FIG. 5 is a block diagram illustrating an alternate commercial use of the present invention.

An alternative embodiment according to the present invention, and with reference now to FIG. 5, allows a company arranging special services for its customers to track the amount of services used by its customers.

FIG. 5 (which is an example of FIG. 2-A) is a block diagram illustrating a preferred embodiment of the present invention, where using an embodiment of RECS 210, a Mutual Fund firm 312 offers access to the services of a Tax Preparation firm 322 after negotiating a special contract to this effect, in such a way that the customers of the Mutual Fund firm 312 do not have to negotiate 802 separate access rights to some services of the Tax Preparation firm 220. The customers 511-514 are notified of the service and allowed access to it using the reaction enabling system 1501 (that, for instance, may be 501 from FIG. 1).

For example, a Mutual Fund Firm A, marked as 312 in FIG. 5, may offer its customers a special service to help them prepare their income taxes early in the year. The tax service will most likely be offered by a Tax Preparation Firm B, 322, with whom Firm A had negotiated a special contract at 802. Such contracts may specify that the offer is only available for the first 4 months of the year and free of charge to Firm A customers. According to the present invention, using the reaction enabling system 1501 (that may again be for instance 501 from FIG. 1) in order to receive the service, a Firm A customer does not have to sign-up for a new account with Firm B. The simple fact is that ContactPoint allows him to receive the tax preparation service until such time as his entitlement to the service is revoked by Company A. During the life of the entitlement, this approach will allow Mutual Fund Firm A to track the number of customers using the tax services, and therefore, can arrange to pay the tax firm for only the level of service provided. As in the previous example, the RECS 210 would be implemented as the RECS 1210 shown in FIG. 3 and 3*a*. Information about the tax preparation firm would be stored in the Resource Identifier data structure (12101 in FIG. 3). Information about the mutual firm's customers would be stored in the user directory including their names and attributes such as the level of policy they have purchased (12103 in FIG. 3). The mutual firm would define a dynamic event so that its customers will have access to the tax preparation firm services starting on the first of the year (12102 in FIG. 3 and 305 in FIG. 3*a*). The access criteria that specifies that this dynamic event id should be provided to users for whom an upgraded policy is stored in the access criteria data structure (12106 in FIG. 3 and 310 in FIG. 3*a*). An entitlement is also added to the Entitlement data structure (12104 in FIG. 3 and 320 in FIG. 3*a*) detailing how access to the resource is to be provided. When the dynamic event specified in the dynamic event table (12102) (as a particular date) is reached, the entitlement processor (12100 in FIG. 3 and 325 in FIG. 3*a*) would match the data user attributes in the user directory (12103) with the access criteria (12106) and optionally add entries to the Tracking data structure (12105, 330) using the information stored in the entitlement data structure (12104) to define the access methods, restrictions, period of use, etc.

An explanation of methods and data used for permitting, handling, and tracking the negotiation for resource is now presented. To further explain how these scenarios can be fulfilled using the present invention we turn again to the Figures and the detailed description above. While FIG. 1 shows the architecture of ContactPoint, the general simplified architecture of the entitlement enabling system according to the present invention is as represented in the various versions of FIG. 2, where the reaction enabling system 1501 (of which 501 from FIG. 1 is an example) has links to the end users 511 and 512, and with OccEntProv using RECS 210 (a possible embodiment of which is shown as 1210 in FIG. 3 and the function described in FIG. 3a). OccEntProv 230 using RECS 210 also has a relationship with some secured site S at 220. The reaction enabling system 1501, using various forms of contracts and dependencies as demonstrated in all versions of FIG. 2, negotiates a contract through 1700 with RECS 210, will give access to S at 220 to (some of) its end beneficiaries, who are customers or employees of COMP 240.

Except in the case of the configurations in FIG. 2-B1 and 2-B2, the provider OccEntProv 230 of occasional entitlements to the users of site S 220 using RECS 210 will contact the owner of site S 220 and negotiate 1700 occasional access to S for some potential set of customers in one of several possible ways that we will describe below.

In the case of the configurations in FIG. 2-B1 and 2-B2, the provider OccEntProv 230 of occasional entitlements to the users of site S 220 belongs to the same entity as S 220 and will contact the company COMP to negotiate occasional access of S 220 for some potential set of customers or employees of COMP 240 in one of several possible ways that we will describe below.

Still with reference to FIG. 2, OccEntProv 230 using RECS at 210 will negotiate at 1800 with S at 220 to obtain from S access rights that can be given to OccEntProv's 230 end users 511 and 512 using access control methods such as passwords, and/or encryption software such as a digital signature. The use of the access method will be recognizable by S 220 as having limited-time use, and the contractual authorization for each attempt to access S 220 will be preferably checked. S 220 will preferably be able to determine from the access method which users are OccEntProv's customers 511, 512. This will allow one form of payment amount computation for the transaction 1700 between OccEntProv 230 and S 220. This will also allow S 220 to keep some statistics to verify the size of the contracts, and may allow some forms of fraud to be more easily detected. These statistics may also be used to negotiate a more favorable contract where charges for permission to use the entitlements is based on one or more of the following: the duration of use of the resource, the number of times the resource is used, the level of resource used, the level of the user, or a dynamic event.

There are alternative embodiments of the invention that improve defining and managing security and authentication of entitlement in computer networking environments.

When using the present invention, the access to a secure site may be transparent to the end customer, who may not notice the site is restricted, or the end customer may knowingly use the temporary entitlement, depending of the choice of preferred embodiment. This is accomplished by providing a description of the resource, the access methods, and the criteria for granting users' permission to the resource. This information would be stored in the resource data structure 12101 in FIG. 3. Users who should be authorized to access the data are informed and provided with the necessary access methods using a Reaction Enabling System (1501) such as ContactPoint.

The present invention may also be used to control access to special functions on a site where limited function access is easily accessible. For instance, the site may serve both to advertise products and allow some users to order some products. Authorization and description of the type of orders (i.e. at a special price) an end user is entitled to can be distributed according to the present invention to facilitate the use of the order functions of the site or service provider S 220. For example, a university could offer its students specially negotiated prices at an eCommerce book store for a limited period of time.

The access control described in this invention provides additional benefits for RECS's 210 beneficiaries in that they do not need to share personally identifying information with S 220 in order to make use of the specially offered access because OctEntProv 230 negotiates the services from S 220 and provides users with methods of accessing S 220 without identifying themselves individually. For example, a department within a university may provide its graduate student population with access to several online journals through a specially negotiated contract between the two organizations. As part of these negotiations, the department received temporary security credentials (such as a user id and password) that it can give to its students so that they can gain access to the journals without providing any personal information about themselves.

Thus, they are for instance:

protected from additional unwanted marketing e-mail from the company owning S 220.

saved the time of having to enter personally identifiable information to the S site 220.

Once the OctEntProv 230 negotiates the use of S's 220 services, the identification and attributes of the resource are stored in the Resource data structure 12101 in FIG. 3, information about OctEntProv's customers is stored in 12103 in FIG. 3, and the access criteria and related dynamic events that OctEntProv 230 determines will be used to decide which customers receive access is stored in the access criteria data store 12106 and in the dynamic event data store 12102 respectively in FIG. 3. The entitlement processor (12100 in FIG. 3) uses all the resource data store and the dynamic event data store to identify the entitlements and how they should be accessed. This is stored in the entitlement data store 12104 in FIG. 3. The entitlement processor (12100 in FIG. 3) matches the access criteria (12106) with the user directory (12103) to determine which of OctEntProv's 230 customers should receive the entitlement. Records of these matches are stored in the Tracking data store (12105 in FIG. 3) along with temporary credentials for allowing access to the site. OctEntProv's 230 customer who have been selected by the entitlement processor 12100 will be notified by the Reaction Enabling System 1501 of both the entitlement and the access method including the temporary credentials that allow them to use the resource without revealing their identity to S 220. The tracking data store 12105 will be used for keeping track of the number of uses of S's resource so that payment can be made according to resources used as was negotiated between OctEntProv 230 and S 220.

Figure 6:
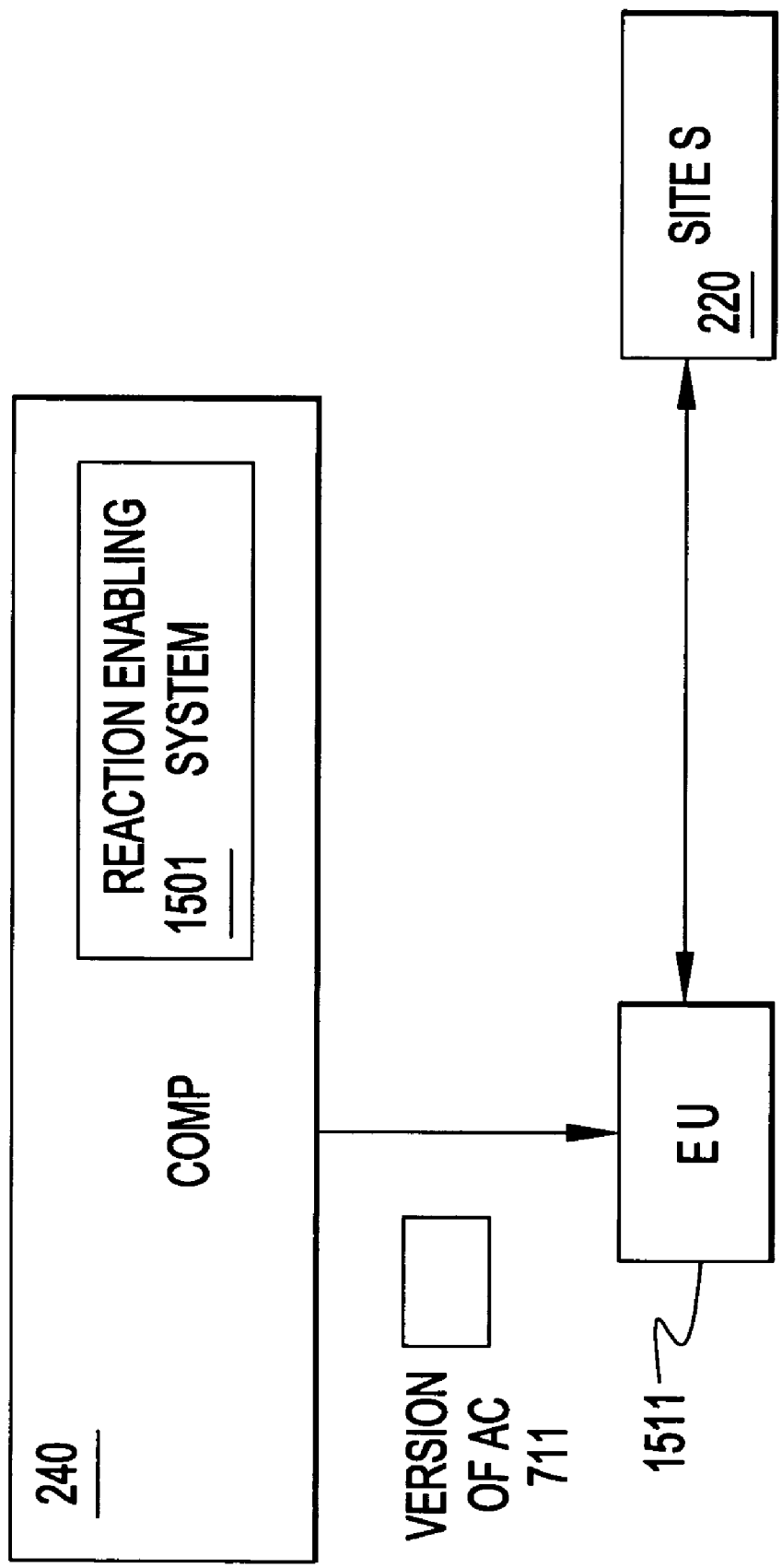

One preferred embodiment of the use of temporary credentials, with reference now to FIG. 6, COMP 240 will distribute a version of what we will call an Access Method, AC 711, (embodiment of an access method) to each end user, EU, at 1511, through the reaction enabling system at 1501 that it owns, with the proper set of instruction on how to use AC 711. EU 1511 will then directly establish a connection with the site S 220. To avoid EU 1511 from forwarding access rights to other parties, several methods of computer and network security technology can be used, as well known in the art. For instance, AC 711 will comprise an AC number which can be used only once.

Extending the example of the university that provided its students with special prices at an e-commerce website, the students at the University (attribute) are given AC that includes a special UserID, web link, (signature), and password which allows them to access a part of commercial site that gives discounts. In this example information about the e-commerce company's website and how it can be accessed (temporary user ids, passwords, and website) would be stored in the resource data structure (12101 in FIG. 3).

In an alternative embodiment, shown in FIG. 6-B, COMP 240 will be the intermediary of all connections between EU 1511 and S 220. COMP 240 will keep the AC 711 of EU 1511 in its database, associated to EU's other data, as much as laws on confidentiality and privacy allow in the country where the invention is used, for use when EU wants to connect with S. It will manage not only EU's access (and the fact it is compatible with all relevant contracts), but also the precise nature of EU's entitlements. In this embodiment the negotiations will be of the form shown in FIGS. 2-C1 and 2-C2, OccEntProv 230, using RECS 210 will preferably negotiate with S 220 so that COMP 240 has to reveal its own identity each time it creates an access to S 220 for one of its own end customers 511 or 512, so that OccEntProv 230 understands better how to charge COMP 240 and EU's identity (shown as 511 and 512 in FIGS. 2-C1 and 2-C2 and generalized to 1511 in FIG. 6-B) is potentially hidden from S 220. Again using the example in which the university negotiated special rates for its students, students would share their personal information (name, address, and credit card information) on a university website. The university, in turn, would connect to the e-commerce site using its own account. The student would order the books. The e-commerce site will send the books to the university who will send them on to the students who placed the order. In this example information about the e-commerce company's website and how it can be accessed (using a university information) would be stored in the resource data structure (12101 in FIG. 3).

In an another alternative embodiment shown in FIG. 6-C, COMP gets from the negotiation between OccEntProv 230 and COMP 240 (for example, as shown in FIGS. 2-C1 and 2-C2), the right to host a replica of the data and services provided by S 221 that the end customers of COMP 240 may use.

Extending the example of the insurance company that provided its members with access to a medical database, the insurance company would negotiate with the medical database company to host a copy of the webpages used to access the medical database on its own website. Therefore, the insurance company's customers would only need access to the insurance company's website and would never deal with the medical database firm.

In all these embodiments, COMP 240 can clearly be part of the same entity as OccEntProv 230, either for some or for all of the sites it wishes to make accessible to its end customers. Different sites may accept deals with OccEntProv 230 only if AC 711 is used in one embodiment, so that several embodiments may have to be used in concurrence to access different sites.

Figure 7A:
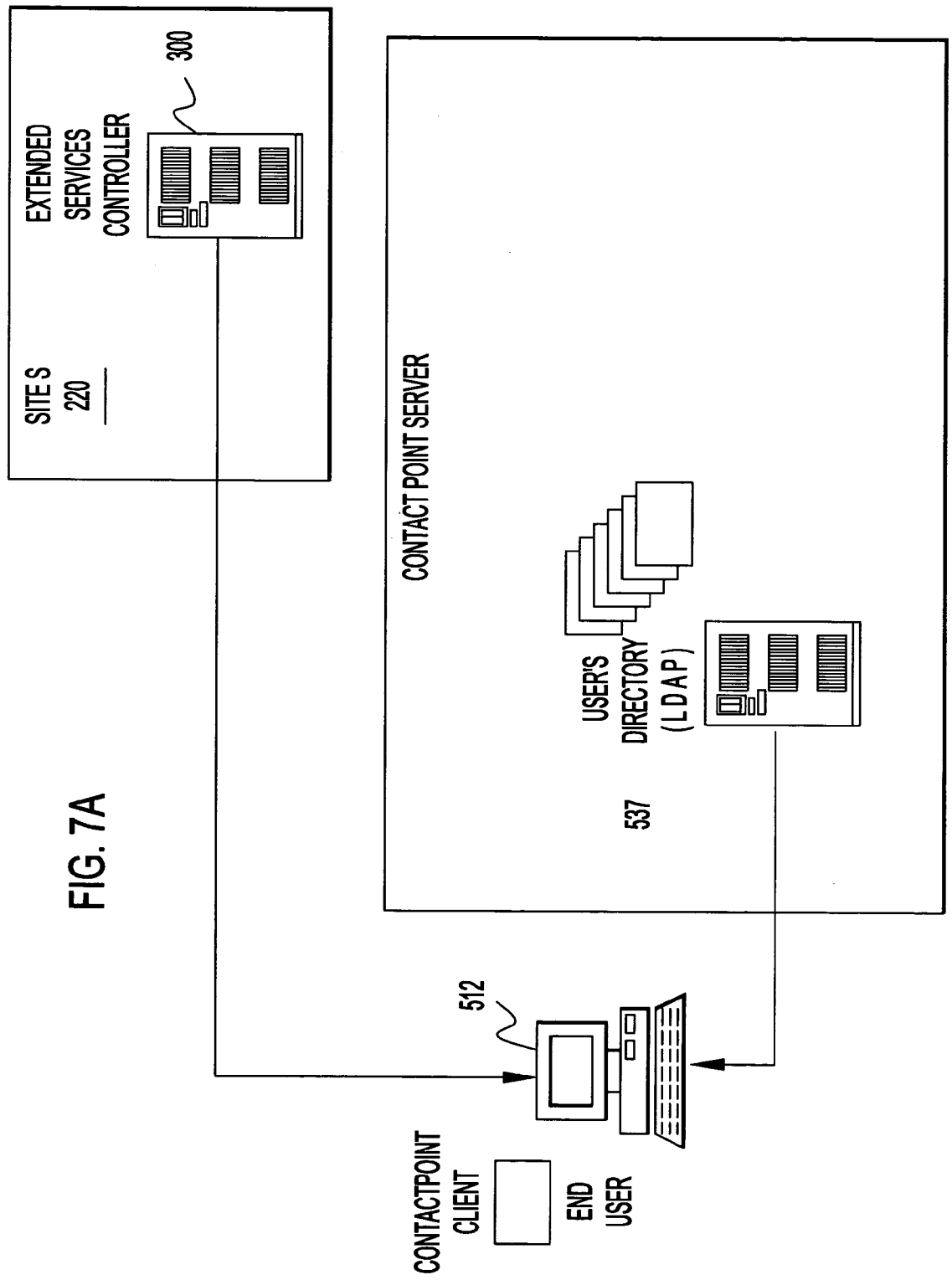
FIG. 7A is a block diagram showing how access to extended services can be proxied through the ContactPoint content server.

FIG. 7A shows how one embodiment can be implemented by giving the ContactPoint Client 512, a temporary copy of the entitlement contract, with a specific expiration date, that the client needs to present to the EXTENDED SERVICES CONTROLLER 300, at Site S 220 to receive the services he is entitled to.

Figure 7B:
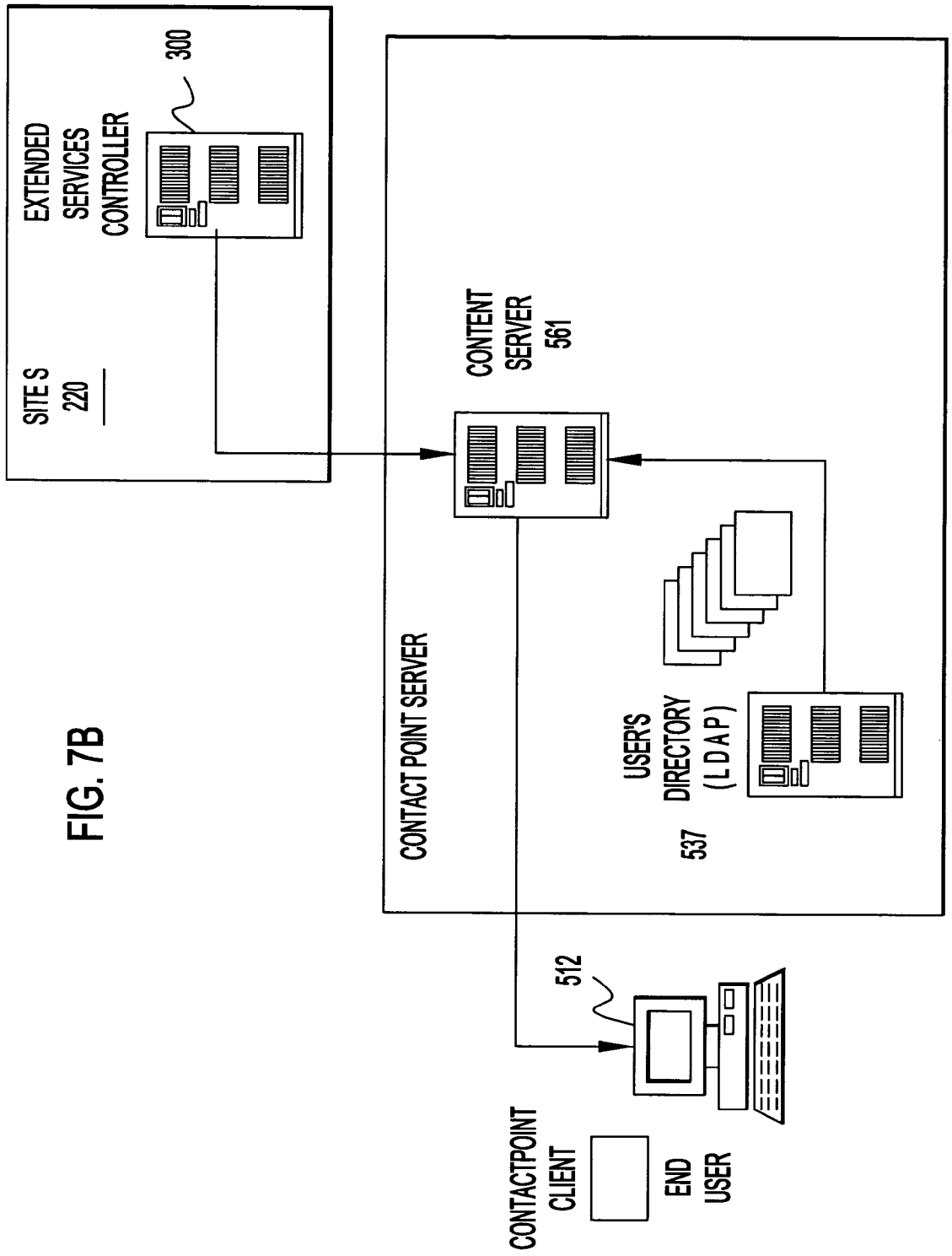
FIG. 7B is a block diagram showing how access to extended services can be made available directly to the client without the use of special proxies.

FIG. 7B shows how the alternative embodiments can be implemented by having the CONTENT SERVER 561, of ContactPoint Server proxy all request from the client to the EXTENDED SERVICES CONTROLLER 300. When ContactPoint Client 512, needs to access a specific service, he sends the request CONTENT SERVER 561, who will forward it to the EXTENDED SERVICES CONTROLLER 300, on behalf of the ContactPoint client 512. For example, the university might provide two entitlements to their students. They may negotiate with the e-commerce book seller to provide discounts to students. In this case, the university would provide temporary user id and password and a web link to the e-commerce company's website. At the same time, the university may negotiate with medical database firm to provide access to the medical information. In this case, the students log on to the university's website and access the medical database firm through a proxy using the university's credentials on the university website.

We claim:

1. A resource entitlement computer server (RECS) system having one or more network connections, the system further comprising:
    a. one or more resource data structures having one or more resource identifiers associated with one or more resources, the resources capable of being provided by a provider;
    b. one or more event data structures having one or more dynamic event identifiers, the dynamic event identifiers each associated with one or more dynamic event attributes;
    c. one or more entitlement data structures associating one or more entitlements with one or more entitlement attributes;
    d. an access data structure that associates one or more of the dynamic events, one or more user attributes, and one or more of the resources with one or more access criteria; and
    e. an entitlement process that, upon the occurrence of one of the dynamic events, determines whether one or more users associated with the respective user attributes, being selected users, meet the access criteria for the respective resource, the entitlement process further granting the selected users permission to access the resource without disclosing the identity of the selected user.

2. A resource entitlement computer server (RECS) system having one or more network connections, the system further comprising:
    a. one or more resource data structures having one or more resource identifiers associated with one or more resources, the resources capable of being provided by a provider;
    b. one or more event data structures having one or more dynamic event identifiers, the dynamic event identifiers each associated with one or more dynamic event attributes;
    c. one or more entitlement data structures associating one or more entitlements with one or more entitlement attributes;
    d. an access data structure that associates one or more of the dynamic events, one or more user attributes, and one or more of the resources with one or more access criteria;
    e. one or more tracking data structures that associate one or more users with resource use information; and
    f. an entitlement process that, upon the occurrence of one of the dynamic events, determines whether one or more of the users associated with the user attributes, being selected users, meet the access criteria for the respective resource, the entitlement process further granting the selected users permission to access the resource without disclosing the identity of the selected user and providing the resource use information to the tracking data structure.

3. A system, as in claim 2, where the dynamic event values include any one or more of the following:
    a time of day, a date, a duration of use, a level of access of the resource, a level of availability of the resource, an accident, a reported error, a user request, a number of uses, a number of users accessing the resource, and a policy change.

4. A system, as in claim 2, where the system assigns permission to access the resource only if one or more of the dynamic event values and one or more user attributes of the selected user satisfy the access criteria.

5. A system, as in claim 2, where the system grants permission to access the resource only if the access criteria include one or more dynamic events.

6. A system, as in claim 2, where the resource use information includes one or more of the following:
a statistic, a resource use statistic, a user attribute statistic, a number of times the permission is granted, a number of times the permission is granted to one of the users, a duration of grant of permission, a number of times the permission is used, a duration of use of the resource, a level of permission being granted, a level of resource being used, a payment amount, a payment method, and one or more attributes of the user.

7. A system, as in claim 2, where there is a charge for the permission.

8. A system, as in claim 7, where the charge is one or more of the following:
a charge for a duration of use of the resource, a charge for a number of times of use of the resource, a charge for a level of resource, a charge for a level of user, and a charge related to one or more of the dynamic events.

9. A system, as in claim 2, where the resource is one or more of the following:
a product, a corporate resource, a financial account, a database, a information database, a medical database, a corporate database, an employee corporate benefit database, an employee benefit, a computer application, a right to performance, a right to order from a vendor, an advertisement, an order for a product, a discount on a product, a discount on a service, a subscription, a journal, a security credential, a service for a term, a method of accessing a resource, a document, a financial document, a medical document, a medical record, an educational document, an insurance document, a tax document, a service, a financial service, a tax service, a government service, an accounting service, an insurance service, a health service, a real estate service, an educational service, an engineering service, a consulting service, a corporate service to an employee, an interaction with a third party, a reduced price, an order from a vendor, and one or more contract terms.

10. A system, as in claim 2, where the provider is one or more of the following:
a third party, a company, a government, an educational institution, a medical institution, an insurance company, a service provider, a marketing company, and an advertising company.

11. A system, as in claim 2, further comprising a reaction enabling system that provides one or more alerts, the alerts being one or more of the resources.

12. A system, as in claim 11, where the alert alerts one or more selected users.

13. A system, as in claim 2, where the selected user is further provided with a temporary identity and authentication that allow the selected user to access the entitled resources without exposing the identity of the selected user to the resource provider.

14. A method of providing access to a resource to one or more users over one or more networks, the method comprising the steps of:
a. receiving one or more dynamic events;
b. verifying that one or more of the users, being a selected user, has one or more user attributes that satisfy one or more access criteria to access one or more resources, the user attributes being other than a user identity; and
c. granting the selected user permission to access the resource without disclosing the identity of the selected user.

15. A method of providing access to a resource to one or more users over one or more networks, the method comprising the steps of:
a. receiving one or more dynamic events;
b. verifying that one or more of the users, being a selected user, has one or more user attributes that satisfy one or more access criteria to one or more resources;
c. granting the selected user permission to access the resource without disclosing the identity of the selected user to a resource provider; and
d. causing the resource provider to provide one or more of the resources to the user without disclosing the identity of the user to the resource provider.

16. A method, as in claim 15, where the dynamic events include any one or more of the following:
a time of day, a date, a duration of use, a level of access of the resource, a level of availability of the resource, an accident, or a reported error, a user request, a number of uses, a number of users accessing the resource, and a policy change.

17. A method, as in claim 15, further comprising the step of tracking the use of the resources by one or more of the selected users.

18. A method, as in claim 17, where the use is tracked by one or more of the following:
a statistic, a resource use statistic, a user attribute statistic, a number of times the permission is granted, a number of times the permission is granted to one of the single users, a duration of grant of permission, a number of times the permission is used, a duration of use of the resource, a level of permission of the resource being granted, a level of resource being used, a payment amount, a payment method, and one or more attributes of the user.

19. A system for providing access to an resource to one or more users over one or more networks, the system comprising:
a. means for receiving one or more dynamic events;
b. means for verifying that one or more of the users, being a selected user, has one or more user attributes that satisfy one or more access criteria to access one or more resources; and
c. means for granting the selected user permission to access the resource without disclosing the identity of the selected user.

20. A service method to provide access to an resource for one or more users over one or more networks, the service method comprising the steps of:
a. receiving one or more dynamic events;
b. verifying that one or more of the users, being a selected user, has one or more user attributes that satisfy one or more access criteria to access one or more resources; and
c. granting the selected user permission to access the resource without disclosing the identity of the selected user.

* * * * *